United States Patent [19]

Toriselli

[11] 4,202,213
[45] May 13, 1980

[54] DEVICE FOR AUTOMATICALLY LOCKING MOTOR VEHICLE WHEELS ON TO BALANCING MACHINES

[75] Inventor: Franco Toriselli, Reggio Emilia, Italy

[73] Assignee: S.I.C.E. Societa Italiana Costruzioni Elettromeccaniche S.p.A., Correggio, Italy

[21] Appl. No.: 888,869

[22] Filed: Mar. 22, 1978

[30] Foreign Application Priority Data

Mar. 29, 1977 [IT] Italy .................. 46841 A/77

[51] Int. Cl.² ............................................. G01M 1/06
[52] U.S. Cl. ........................................................ 73/487
[58] Field of Search ................... 73/487, 485, 460; 144/288 A

[56] References Cited

U.S. PATENT DOCUMENTS

| 3,049,159 | 8/1962 | Gambardella | 144/288 A |
| 3,291,171 | 12/1966 | Lehmann | 144/288 A |
| 4,118,989 | 10/1978 | Wood | 73/487 |

Primary Examiner—Jerry W. Myracle
Attorney, Agent, or Firm—Brisebois & Kruger

[57] ABSTRACT

A device for automatically locking motor vehicle wheels on to balancing machines in general comprises a traction shaft inserted into and rotating rigidly with a hollow balancing shaft, and of which one end is connected axially to the piston of a cylinder-piston unit while its other end is provided with locking means for the support members of the wheels to be balanced.

4 Claims, 4 Drawing Figures

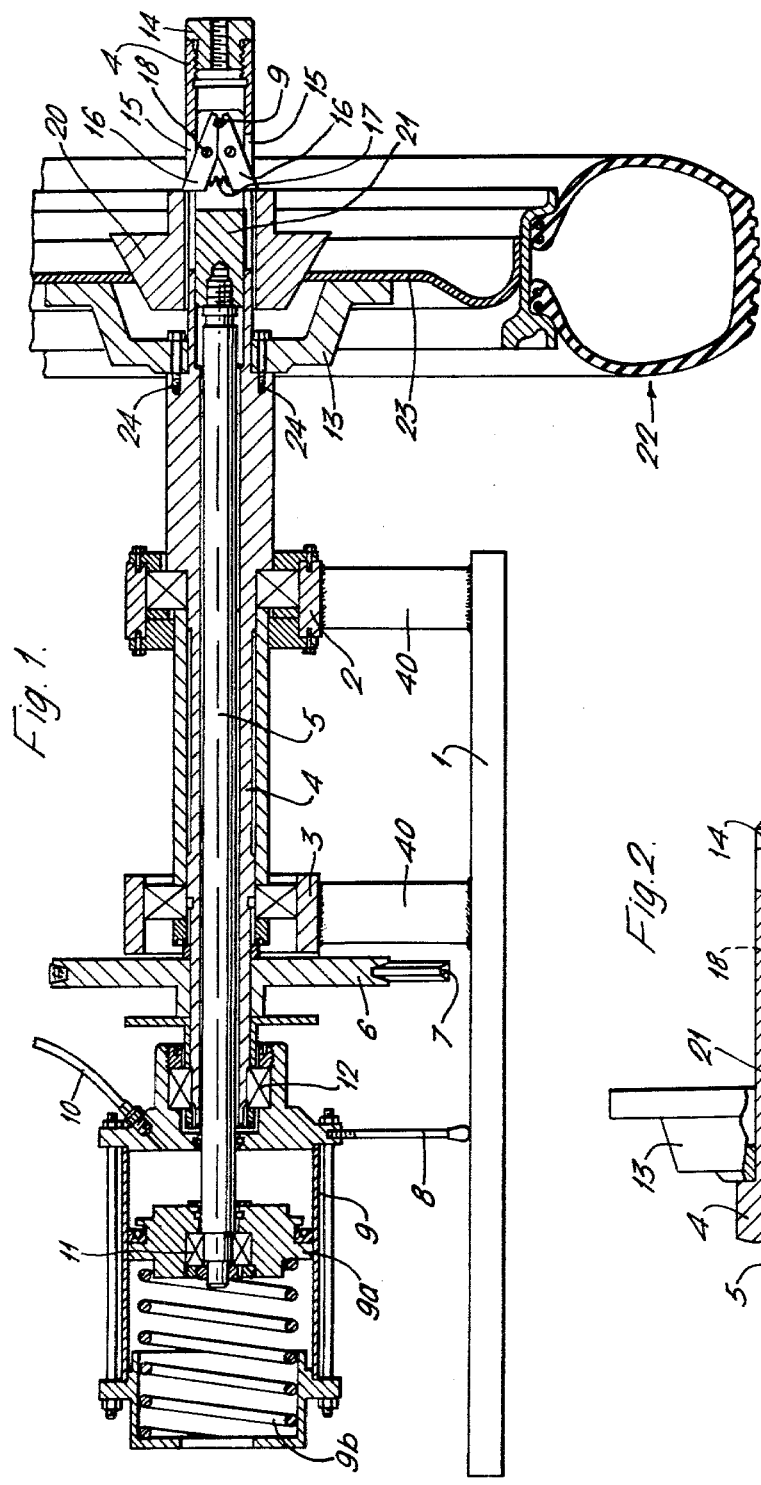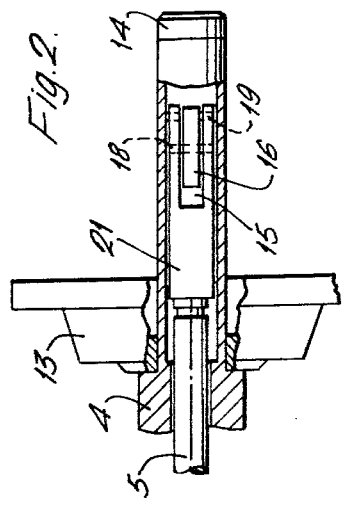

DEVICE FOR AUTOMATICALLY LOCKING MOTOR VEHICLE WHEELS ON TO BALANCING MACHINES

SUMMARY OF THE INVENTION

This invention relates to a device which automatically locks motor vehicle wheels on to the balancing shafts of balancing machines in general.

All balancing machines are notably provided with a balancing shaft projecting from the balancing machine casing, and on the free end of which the wheel to be balanced is fixed by suitable means.

Various methods are notably used at the present time for obtaining said locking, one of which consists of resting the wheel rim against a plate rigid with the balancing shaft, and pressing said rim against said plate by a cone frustum member.

Said cone frustum member is pressed by a convenient threaded element, for example a ring nut, which is screwed on to the free end of the balancing shaft.

Another locking method commonly used employs a first plate rigid with the balancing shaft, and against which the rim is rested, this plate being provided with suitable drive stems for the rim. In said second known method, a counter-plate is pressed against the other side of the rim by a ring nut or a like element which is screwed on to the free end of the balancing shaft.

Another known method, normally used in electronic or electro-dynamic balancing machines, consists of locking the wheel rim by means of screws on a platform, from the central region of which branches a sleeve. This latter is then mounted on the balancing shaft and locked in the required position thereon by virtue of the fact that its free hollow end comprises a plurality of slots which enable said end to be expanded resiliently outwards by inserting a suitable member. However, the locking devices of the aforesaid type although being suitable for their purpose show a series of serious drawbacks.

Firstly, the mounting of the wheel, the mounting of the centering cone and the clamping of this latter by means of a ring nut or another equivalent member are all carried out manually. The main drawbacks derive in particular from the clamping of the centering cone, i.e. the clamping of the counter-plate or the locking of the flanged sleeve on to the balancing shaft. These clamping or locking operations are very long, laborious and complicated.

Again, said complication, laboriousness and length which characterise the operations involved in locking or clamping the wheel rim occur not only during the mounting stage but also during the removal of the wheel from the balancing shaft. Moreover, said locking or clamping requires excessive force by the operator, both during mounting and during removal, in that in order to obtain reliable, accurate and perfect balancing, the wheel must be rigidly connected to the balancing shaft in order to prevent any relative movement between the wheel rim and balancing shaft during the actual balancing operation.

It is therefore apparent that the operator is required to exert considerable continuous effort in performing said clamping and thus ensure a perfect connection between the wheel and the balancing shaft.

Said effort is also required when balancing is terminated, and the aforesaid drawbacks arise to a greater extent the larger the number of wheels to be balanced.

One object of the invention is to provide an automatic device for locking wheels on to balancing machines in general, which enables said locking and the subsequent release to be performed without requiring any effort on the part of the operator.

A further object of the invention is to provide an automatic locking device, the clamping force of which is constant for all types of wheel, whatever its position on the balancing shaft.

A further object of the invention is to provide an automatic locking device which rigidly connects the wheel to the balancing shaft and prevents any relative movement during the balancing stage between the wheel rim and balancing shaft, so as to enable the degree of unbalance to be accurately and properly determined.

A further object of the invention is to provide an automatic locking device which is compatible with any balancing machine.

In this respect, it is the intention of the present patent of invention to propose and protect an automatic device for locking wheels on to balancing machines in general which eliminates the aforesaid disadvantages while being of simple, rational and highly reliable construction.

This is attained according to the invention by providing a traction shaft which is disposed, and can slide, inside the hollow balancing shaft of the balancing machine. That end of said traction shaft which is within the casing of the balancing machine penetrates into a pneumatically operated single acting cylinder-piston unit and is connected axially but not torsionally to the piston of said single acting cylinder-piston unit, which does not rotate and is conveniently connected to a pneumatic power unit.

According to an improved embodiment of the invention, said single or double acting cylinder-piston unit rotates rigidly with the balancing shaft, a suitable rotary distributor being disposed between said single or double acting cylinder-piston unit and the pneumatic power unit. According to the invention, that end of the traction shaft which is disposed in the projecting end of the balancing shaft is connected to a cylindrical member, the end of which is configured as a fork. Two oscillating pawls are hinged to this latter, and their points engage during the working stage with a centering cone or driving counter-plate by way of two suitable opposing longitudinal slots provided in the terminal projecting part of the balancing shaft, whereas during the non-working stage they completely re-enter within the overall bulk of the balancing shaft.

The objects and advantages, together with the operational characteristics and constructional merits of the invention will be more evident from the detailed description given hereinafter with reference to the figures of the accompanying drawings which illustrate one preferred embodiment thereof together with various examples of application, this embodiment being given by way of non-limiting example.

FIG. 1 is a longitudinal section through the invention.

FIG. 2 is a partially sectional plan view of the projecting end of the invention.

Figure 3:
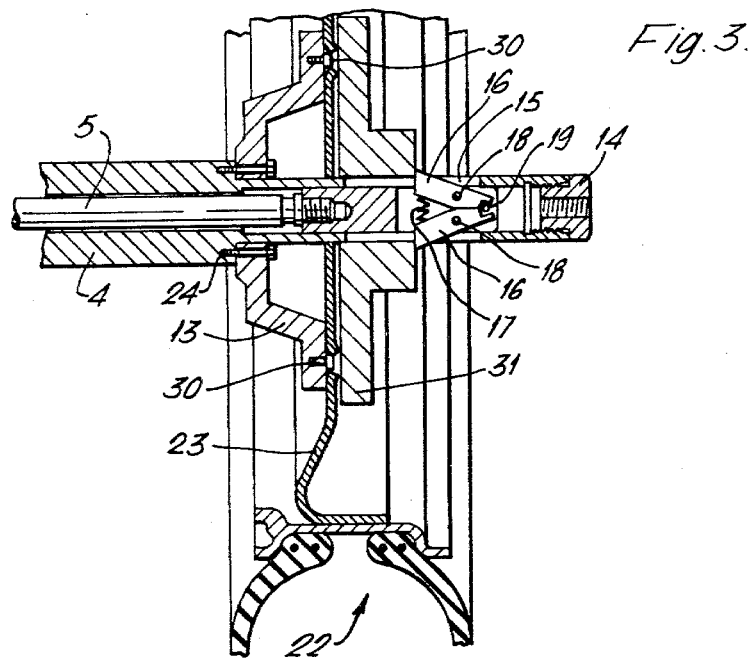
FIG. 3 is a partial longitudinal section through the invention, which is mounted on a balancing shaft provided with a plate and counter-plate.

Said figures, and in particular FIG. 1, show a platform 1 from which branches a pair of vertical columns 40, the top ends of which carry the balancing supports 2 and 3 respectively for the right hand side and left hand side of the wheel to be balanced 22. Said balancing supports 2 and 3 are traversed by a hollow balancing shaft 4, on which, to the side of the balancing support 3, is keyed a grooved wheel 6 about which is wound the V belt 7 which drives the hollow balancing shaft 4 by means of a suitable drive unit. The left hand end of the hollow balancing shaft 4 penetrates into the head of a pneumatically operated single acting cylinder-piston unit 9, and a suitable bearing 12 is disposed between said shaft 4 and said head. The chamber of the single acting cylinder-piston unit 9 is connected by a suitable conduit 10 to a pneumatic power unit. A piston 9a is disposed in the chamber of the single acting cylinder-piston unit 9, and its working stroke is opposed by a compression spring 9b, one end of which rests on the rear face of said piston 9a.

From the bottom region of the head of the single acting cylinder-piston unit 9, there branches a pair of adjustable vertical feet 8, the lower ends of which are in contact with the platform 1.

The left hand or rear end of a traction shaft 5, which is axially engaged with said piston 9a, is inserted into the central region of the piston 9a via a suitable rolling bearing 11. The traction shaft 5 extends from said piston through the head of the single acting cylinder-piston unit 9, to pass inside the hollow balancing shaft 4 and nearly reach the front projecting end thereof. The projecting end part of the balancing shaft 4 comprises a suitable shoulder against which a support plate or disc 13 for the rim 23 of the wheel 22 is rested and fixed by screws 24.

The end of the traction shaft 5 comprises a threaded stem substantially in a position corresponding with said support disc 13, and on which is screwed a cylindrical member 21 disposed in the end projecting part of the balancing shaft 4. The termination of the projecting end of the balancing shaft 4 is closed by a threaded cover 14.

The free end of the said cylindrical member 21 is configured as a fork, with two pins 18 fixed to its arms in symmetrically opposing positions relative to the longitudinal axis of symmetry. Two teeth or pawls 16 are pivoted on said pins 18 in the compartment defined by said fork, and are kept spaced apart by a compression spring 17 lying between those free ends of said pawls which face the crosspiece of said fork. A further pin 19 is provided on the free ends of the arms of said fork, and in contrast to the pins 18 is coplanar with the longitudinal axis of the fork. In the position shown in FIG. 1, it can be seen that the free ends of said pawls 16 are disposed in two longitudinal opposing slots 15 provided in the hollow balancing shaft 4. The said free ends rest against the outer flat circumferential edge of a cone frustum member 20 mounted on the projecting end of the balancing shaft 4, its conical surface being in contact with the outer edge of a central bore provided in the rim 23.

With particular reference to the different application of the device according to the invention shown in FIG. 3, it can be seen that a circular plate 13, into which a plurality of centering studs 30 is screwed, is fixed on the shoulder at the projecting end of the hollow balancing shaft 4. The inner surface of the rim 23 rests against the outer flat edge of said plate 13, with the through rim bores used for mounting the wheel 22 on the motor vehicle housing the centering studs 30. On the opposite face of said rim 23 there rests a counter-plate 31, the outer flat circumferential edge of which is in contact with the free ends of the pawls 16 when the device is closed as shown in FIG. 3.

Figure 4:
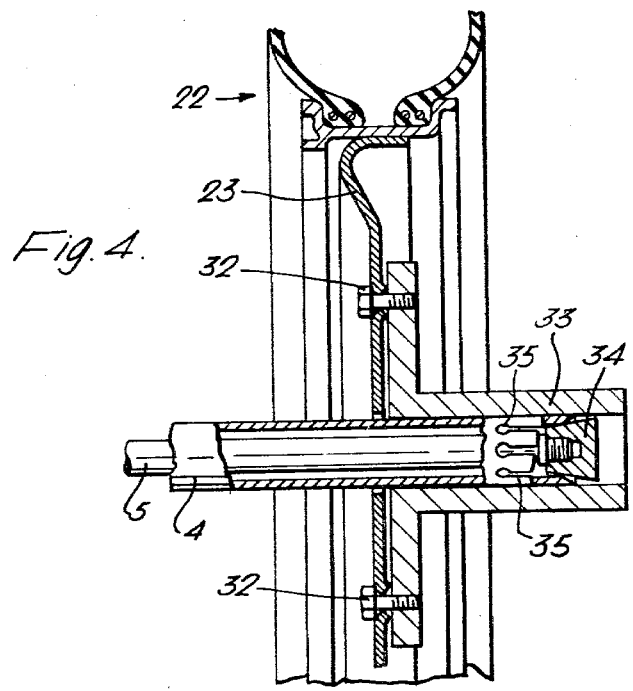
FIG. 4 is a further partial longitudinal section through the invention, mounted on a balancing shaft provided with a flanged sleeve.

With reference to the further application of the device shown in FIG. 4, it can be seen that a flanged sleeve 33 is mounted on the projecting end of the hollow balancing shaft 4. The rim 23 of the wheel 22 is fixed on to the flange of said flanged sleeve 33 by screws 32. Again in this case, the free end of the traction shaft 5 is provided with a threaded stem on which a cone frustum member 34 is screwed. The free end of the hollow balancing shaft 4 is however provided with a set of longitudinal grooves 35 to define a plurality of resilient longitudinal sectors. The inner edge of the free end of the hollow balancing shaft 4 is suitably bevelled to constitute a lead-in for the cone frustum member 34.

Finally, the single acting cylinder-piston unit 9 does not necessarily have to be stationary, but can instead be fixed by its head to the hollow balancing shaft 4, in which case a suitable rotary pneumatic distributor would be disposed between the compressed air free conduit 10 and the working chamber of the said single acting cylinder-piston unit 9. The device described heretofore operates in the following manner.

With reference to FIG. 1, assuming that the return spring 9b is initially completely extended, then the piston 9a is resting on the head of the single acting cylinder-piston unit 9. This means that the traction shaft 5 is displaced completely towards the right, because of which the pawls 16, by making contact by their outer edges with the transverse edges of the longitudinal slots 15 in the hollow balancing shaft 4, rotate about their pivot pins 18, at the same time compressing the compression spring 17 so that their free ends approach each other and lie within the total bulk of the hollow balancing shaft 4. In this position, the machine is ready for balancing a wheel 22. At this point, the operator takes the wheel to be balanced 22 and mounts it on the projecting end of the hollow balancing shaft 4, resting the rim 23 against the support disc 13.

At the same time the operator mounts the cone frustum member 20 on to the projecting end of the hollow balancing shaft 4, so that its conical surface makes contact with the outer edge of the central bore in the rim 23. Keeping the wheel 22 and cone frustum member 20 in the said position, the operator then operates a suitable pedal, not illustrated for clarity and simplicity of drawing, and because it is of known type, which is connected to the distributor of the pneumatic power unit. This operation causes air to be fed under pressure through the feed conduit 10 and into the working chamber of the single acting cylinder-piston unit 9. Said pressurised air displaces the piston 9a towards the left, so compressing the return spring 9b. The displacement of the piston 9a also displaces the traction shaft 5 which follows the piston 9a in its stroke towards the left. Because of this, the pawls 16 are also displaced towards the left, and withdraw from each other by rotating about the support pins 18, both because of the action of the compression spring 17 and because of the sliding between the upper edges of the pawls 13 and the transverse edges of the longitudinal slots 15, so that the free ends of the pawls make contact with the outer flat circumferential edge of the cone frustum member 20. The action of said pawls 16 on the cone frustum member 20 means that the rim 23 of the wheel 22 is reliably locked against the support disc 13 and is perfectly centered thereto.

The purpose of the stop pin 19 is to enable the pair of pawls 16 to make the same rotation about their own support pin 18. In this respect, even if the said pair of pawls 16 rotates in the same direction during the working stroke of the traction shaft 5, at a certain point one of said pawls 16 comes into contact with the stop pin 19 and, because of the presence of the compression spring 17, the second pawl 16 is also compelled to make the same rotation as made by the first pawl. The rotation of the second pawl 16 terminates when its end comes into contact with the stop pin 19. At this point, the operator can balance the wheel 22 by operating the balancing machine. The drive unit of this latter rotates the grooved wheel 6 by way of the V belt 7, so rotating the hollow balancing shaft 4. This latter can freely rotate on the head of the single acting cylinder-piston unit because of suitable bearings on the balancing supports 2 and 3 and by way of the rolling bearing 12, and freely entrains the traction shaft 5 because of the presence of the pawls 16 in the longitudinal slots 15. The traction shaft 5 is free to rotate via the bearing 11 disposed between its end and the piston 9a.

It is apparent that the hollow balancing shaft 4 is stopped, and the wheel 22 is removed from the projecting end of the balancing shaft 4, by procedures which are the reverse of those heretofore described. Even where the single acting cylinder-piston unit 9 rotates rigidly with the hollow balancing shaft 4, the wheel 22 is mounted, balanced and then removed from the projecting end of the balancing shaft 4 in the manner heretofore described. Finally, the stationary or rotating cylinder-piston unit 9 can be double acting instead of single acting.

In the particular case shown in FIG. 3, when the traction shaft 5 is completely displaced towards the right, i.e. towards the projecting end of the balancing shaft 4, the rim 23 of the wheel to be balanced 22 is placed resting against the plate 13 with the centering studs 30 inserted into the through bores provided in said rim 23. After doing this, a counter-plate 31 is rested against the opposite face of the said rim 23, and is then caused to press the rim 23 against the plate 13 by means of the pawls 16 as heretofore described. Balancing then takes place in the same manner, and the wheel to be balanced is then removed by a reverse operation to that heretofore described.

Finally, with reference to the further application of the device shown in FIG. 4, before being mounted on the balancing shaft 4, the rim 23 of the wheel to be balanced 22 is fixed on to the flange of the flanged sleeve 33 by bolts 32.

In this case, after mounting the flanged sleeve 33 on the projecting end of the hollow balancing shaft 4, the rim 23 of the wheel to be balanced 22 is then exactly positioned by a suitable spacer provided with the balancing machine. Having effected this exact positioning, the operator operates the pedal which controls the distributor of the pneumatic power unit so that the piston 9a of the single acting cylinder-piston unit 9 pulls the traction shaft 5 towards the left. As a result of this displacement, the cone frustum member 34 is also displaced by the traction shaft 5 and penetrates into the bore in the shaft 4, so opening or expanding the longitudinal resilient sectors defined by the longitudinal slots 35 provided at the end of the hollow balancing shaft 4. The expansion of said resilient sectors leads to the locking of the flanged sleeve 33 and consequently of the wheel to be balanced 22 on the hollow balancing shaft 4. Again in this latter case, balancing is performed in the usual manner, and the flanged sleeve 33 is released from the hollow balancing shaft 4 in the reversed manner to that described.

The invention is not limited to the single embodiment heretofore described, and modifications and improvements can be made thereto without leaving the scope of the invention, the basic characteristics of which are summarised in the following claims.

What is claimed is:

1. A device for automatically locking motor vehicles wheels on to the projecting end of a high speed rotating support shaft, which comprises:
    (a) an axially hollow support shaft,
    (b) a traction shaft therein inserted, which rotates rigidly with said support shaft,
    (c) a stationary cylinder-piston unit at one end of said hollow support shaft, the piston of which is connected to one end of the traction shaft by bearing means mounting the shaft for rotation relative to the piston,
    (d) the other end of the said traction shaft which projects from the support shaft comprising means for locking a wheel on said support shaft and comprising at least one pair of teeth or pawls which oscillate mutually and are symmetrically disposed about the longitudinal axis of the traction shaft, and which are disposed between and pivoted on the arms of a fork fixed to the free end of the traction shaft; between the facing edges of the engaging ends of said at least two pawls there being disposed a compression spring lying in front of the crosspiece of said fork.

2. A device as claimed in claim 1, wherein bearings are disposed between the head of the stationary cylinder-piston unit and the end of the support shaft, and between the piston of said cylinder-piston unit and the end of the traction shaft.

3. A device as claimed in claim 1, wherein the terminal part of the hollow support shaft is provided with two longitudinal opposing slots aligned with the compartment defined by the arms of said fork, and in which the engaging ends of said two pawls are disposed and slide.

4. A device as claimed in claim 1, wherein a stop pin for those two pawl ends farthest from the engagement ends is provided in the central region between said two ends, and is fixed to the free terminal regions of said arms.

* * * * *